M. J. BARRETT.
RAIL CLEARING DEVICE.
APPLICATION FILED MAR. 17, 1915.
1,147,069.
Patented July 20, 1915.
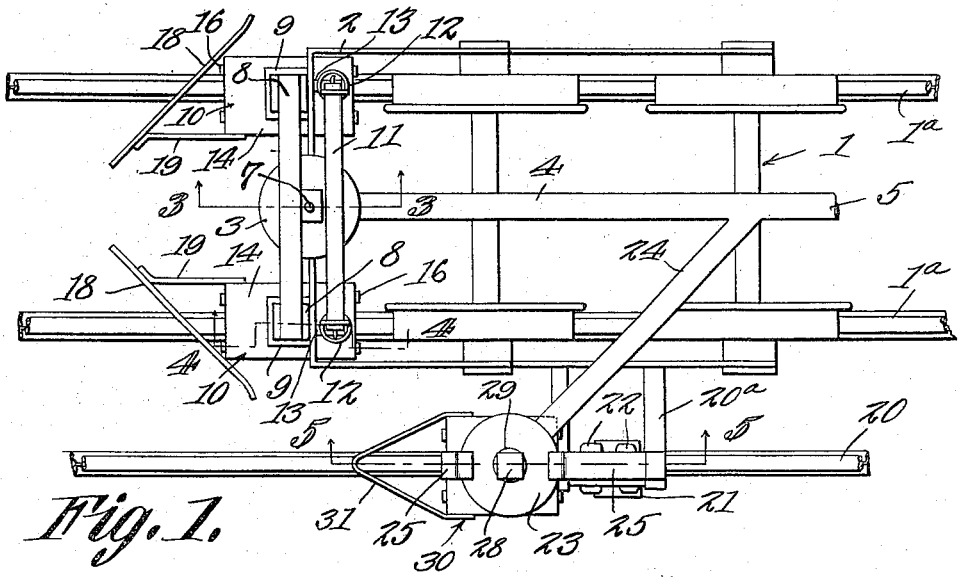
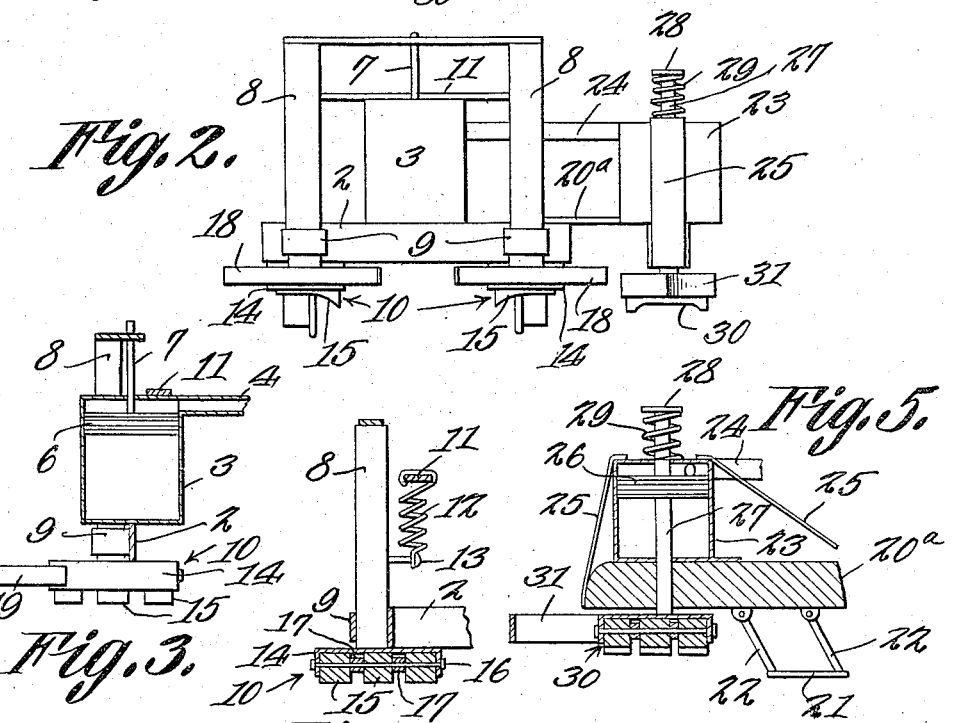
Witnesses
Martin J. Barrett, Inventor,
by C. A. Snow & Co.,
Attorneys.

UNITED STATES PATENT OFFICE.

MARTIN J. BARRETT, OF MINERS MILLS, PENNSYLVANIA.

RAIL-CLEARING DEVICE.

1,147,069.  Specification of Letters Patent. Patented July 20, 1915.

Application filed March 17, 1915. Serial No. 15,103.

*To all whom it may concern:*

Be it known that I, MARTIN J. BARRETT, a citizen of the United States, residing at Miners Mills, in the county of Luzerne and State of Pennsylvania, have invented a new and useful Rail-Clearing Device, of which the following is a specification.

The present invention appertains to a track clearer and fender, and aims to provide a novel and improved device which is operable for cleaning snow, grease and other extraneous matter from the rails, and which is also arranged to act as a fender to deflect stones or other objects off of the rails.

It is the object of the invention to provide a track clearing device of novel construction and operation, whereby it will effectively serve its intended purposes, and whereby the clearing shoes and fenders are normally raised off of the rails, and may be readily and effectively brought into coöperative relation with the rails, when circumstances necessitate or render it desirable.

It is also within the scope of the invention to provide an apparatus of the nature indicated, which is comparatively simple, nonencumbering and inexpensive in construction, which may be readily installed or applied upon the truck or running gear of a street car, locomotive, or other vehicle traveling upon rails, and which will be practical and efficient in operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—

Figure 1 is a plan view of the apparatus applied to a car truck. Fig. 2 is a front elevation thereof. Figs. 3, 4 and 5 are vertical sections taken on lines 3—3, 4—4 and 5—5, respectively, of Fig. 1.

In the drawing, there is depicted a truck 1 of a street car, locomotive or other vehicle traveling upon the rails $1^a$ of a track, and which truck carries the present mechanism, although it is to be understood that the present mechanism is applicable to the trucks or other suitable portions of various street cars, locomotives, and the like.

In carrying out the invention, there is provided a yoke 2 which is terminally secured to the journal boxes or other suitable portions of the truck 1, and which extends around the front of the truck, the yoke being disposed horizontally.

An upright or fluid cylinder 3 is secured upon the intermediate portion of the yoke 2, and has attached to its upper end, the branch 4 of the air or pressure fluid pipe 5 of the car, locomotive, or the like. A piston 6 works within the cylinder 3, and is provided with an upstanding piston rod 7 sliding through the upper end of the cylinder 3, and attached to the intermediate portion of a vertically reciprocable yoke or arch 8 which has its limbs slidably engaging through guides 9 carried by the yoke 2 at the opposite sides of the cylinder 3. The yoke 8 is disposed transversely, and carries at its ends, the rail shoes 10 which are carried above the rails $1^a$ to coöperate therewith when the yoke 8 is moved downwardly.

The yoke 8 is normally raised, and to this end, a transverse bar 11 is secured upon the upper end of the cylinder 3 in rear of the yoke 8, and coiled wire retractile springs 12 have their upper ends connected to the ends of the bar 11, and have their lower ends connected to rearwardly projecting pins or elements 13 carried by the limbs of the yoke 8 above the guides 9. Thus, the yoke 8 will be normally raised under the influence of the springs 12.

Each of the shoes 10 embodies a cap member 14 within which a series of transverse squeegee members 15 of rubber or similar material is secured. In order to secure the squeegee members 15 within the cap member 14, longitudinal bolts or securing elements 16 are engaged through the members 15 and ends of the cap member 14, and spacers 17 are mounted upon the bolts 16 between the squeegee members 15 for holding them separated. The squeegee members 15 project downwardly below the rim of the cap member 14 and the spacers 17, whereby the squeegee members may contact with or bear upon the rails $1^a$ when the yoke 8 is depressed, the spacing of the squeegee members 15 providing recesses therebetween, whereby each of the squeegee members will be effective for cleaning or wiping the rail.

Rearwardly diverging fenders 18 are carried by the shoes 10, longitudinal braces 19 being secured to the forward end portions of the fenders 18 and to the inner sides of the cap members 14. The fenders 18 are thus carried by the shoes 10 and serve to deflect to the opposite sides, stones and other objects upon the rails.

If a third rail 20 is employed in connection with the main rails 1ª, a clearer and fender may be carried by the truck 1 to coöperate with the third rail 20 and to this end the truck 1 carries an outstanding bracket 20ª overhanging the third rail 20. This bracket 20ª carries the contact 21 which bears continually upon the third rail 20, the contact 21 being carried by swinging hangers or stirrups 22 depending from the bracket 20.

An upright cylinder 23 is mounted upon the bracket 20ª above the third rail 20 and in the path of the contact 21, and a branch 24 of the air or fluid pressure pipe 5 is connected to the upper end of the cylinder 23. Inclined braces 25 are secured to the bracket 20 in front and rear of the cylinder 23 and are secured to the upper end of the cylinder for holding the cylinder in place. A piston 26 works within the cylinder 23, and the piston rod 27 thereof projects upwardly and downwardly, the upper portion of the piston rod passing slidably through the upper end of the cylinder 23 and having a collar or member 28 at its upper end. A coiled wire expansion spring 29 is disposed between the collar 28 and upper end of the cylinder 23 for normally raising the piston rod and the shoe 30 carried by the lower end thereof. The piston rod 27 passes slidably through the lower end of the cylinder 23 and bracket 20ª, and the shoe 30 is carried by the lower end of the piston rod below the bracket to coöperate with the third rail 20. The shoe 30 is of the same construction as the shoes 10 above described, so that a reiteration of description is not necessary. A V-shaped fender 31 is terminally secured to the sides of the shoe 30 and projects forwardly so as to deflect stray objects off of the rail 20.

Although the cleaning devices and fenders for both the main and third rails are illustrated and described, it will be understood that either of them may be eliminated if not necessary or desirable.

In operation, when the air pipe or line 5 is opened, to allow the air to escape from the cylinders 3 and 23, the piston rods will be raised under the influence of the respective springs which will raise the shoes and fenders carried thereby off of the rails. When the air is let into the branches 4 and 24, it will enter the cylinders and thereby depress the pistons so as to lower the shoes and fenders when it is desired to bring either the shoes or fenders, or both, into operation.

The shoes having the squeegee members are of advantage for cleaning snow, grease, moisture or other extraneous matter off of the treads of the rails, in order that a perfect contact with the rails may be had, or in order that the rail treads may be cleaned so that the wheels will not slip. When the shoes are lowered, the squeegee members or strips will contact with the rails, and will wipe any sleet, moisture, snow or foreign matter off of the rails, for the intended purposes. The shoes and fenders may thus be readily brought into operation when the air is turned on into the coöperating cylinders 3 and 23, it being understood that the motorman or operator is in control of suitable means for admitting air into the cylinders at will or when circumstances necessitate it.

The present apparatus is particularly useful in bad weather, for cleaning the rails, whereby the car or locomotive may operate properly, and the present contrivance is of advantage for other reasons which will be apparent to those familiar in the art.

Having thus described the invention, what is claimed as new is:

In a track cleaner, a yoke, an upright fluid cylinder carried by the intermediate portion thereof, an arch having its limbs guided by the yoke, cleaning shoes carried by the ends of the arch, and a piston working in the cylinder and having an upstanding piston rod attached to the intermediate portion of the arch.

In testimony that I claim the foregoing as my own, I have hereto affixed my signature in the presence of two witnesses.

MARTIN J. BARRETT.

Witnesses:
 GEORGE MONDULICK,
 THOMAS TOOLE.

Copies of this patent may be obtained for five cents each, by addressing the "Commissioner of Patents, Washington, D. C."